Sept. 18, 1928.  
R. W. HYDE  
1,684,958  
PROCESS OF TREATING FINES OF EARTHY MINERALS  
Filed April 30, 1925  2 Sheets-Sheet 1
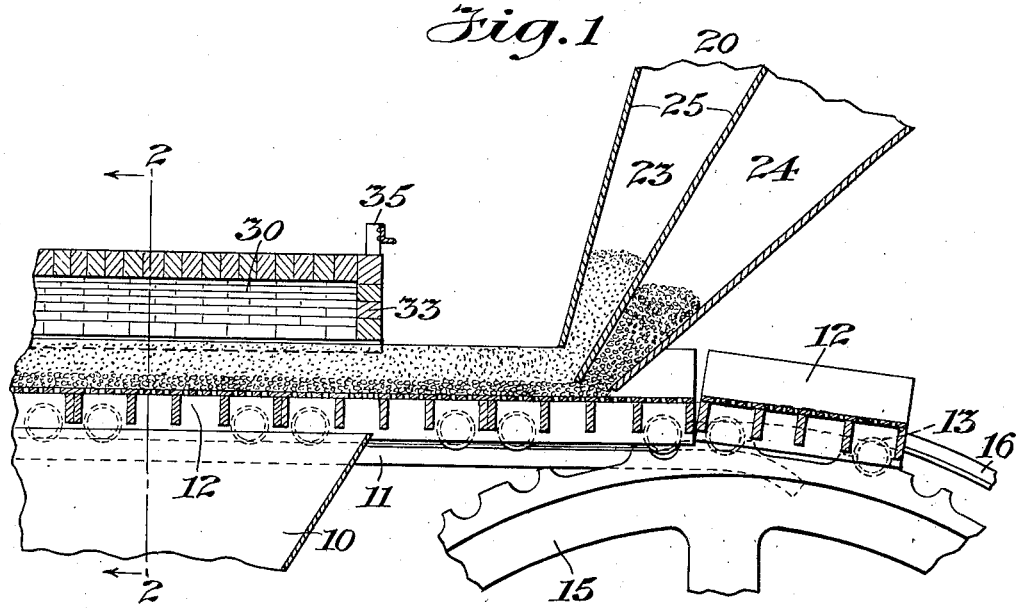
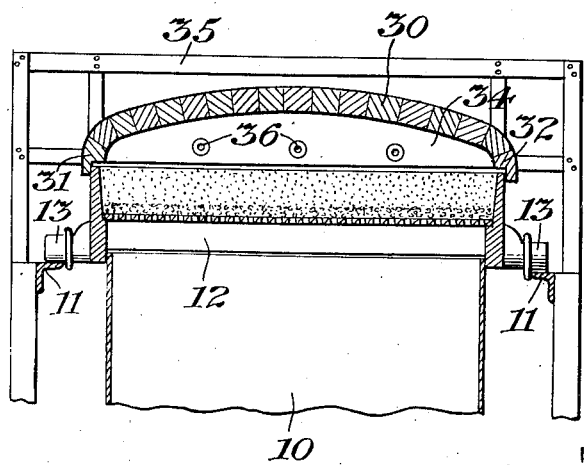
INVENTOR  
Reed W. Hyde  
BY Albert M. Austin  
HIS ATTORNEY

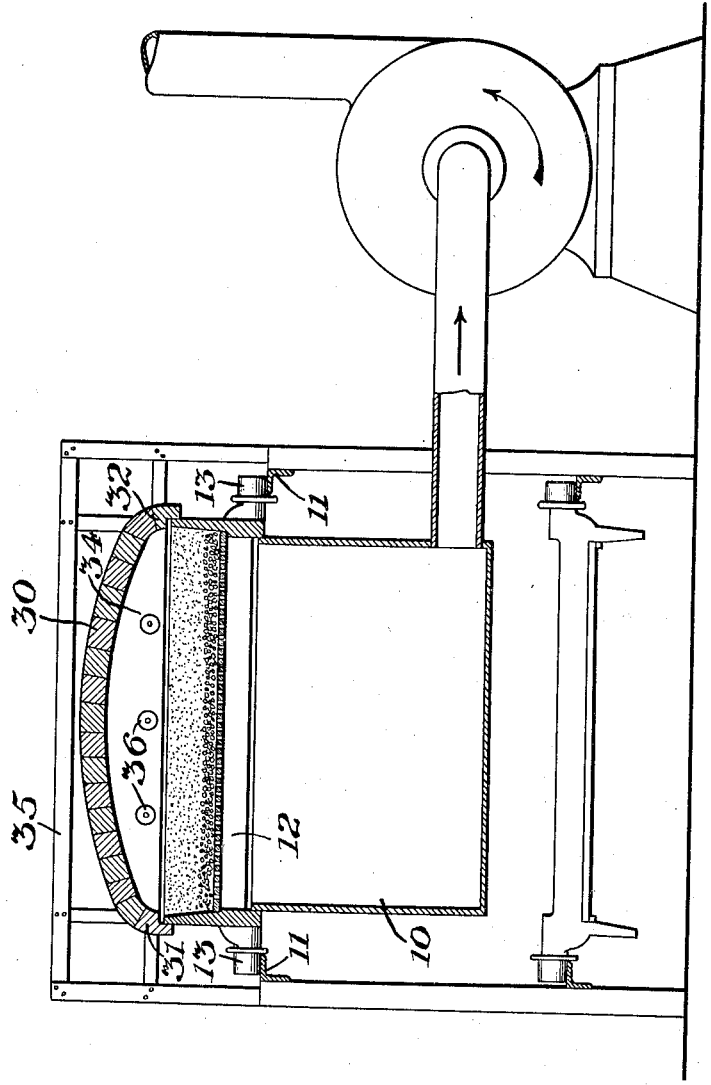

Patented Sept. 18, 1928.

1,684,958

UNITED STATES PATENT OFFICE.

REED W. HYDE, OF SUMMIT, NEW JERSEY, ASSIGNOR TO DWIGHT & LLOYD METALLURGICAL COMPANY, OF NEW YORK, N. Y., A CORPORATION OF NEW JERSEY.

PROCESS OF TREATING FINES OF EARTHY MINERALS.

Application filed April 30, 1925. Serial No. 26,924.

This invention relates generally to the burning of earthy minerals and particuarly to the burning of carbonates such as lime rock, dolomite, and magnesite, in comparatively small masses or units spread in a relatively thin layer upon a support or supports capable of continuous or intermittent movement into and through a heated zone or area whereby carbon dioxide is removed from such materials.

The invention relates especially to the treatment of finely divided material commonly known as fines. This grade of material gives off such large quantities of dust under ordinary methods of treatment as practically to prohibit its economical treatment on a commercial scale by any of the methods heretofore known. In a shaft furnace for example there is a constant downward movement of the material through the stack and if fines are present in the charge they pack and choke the draft through the stack. The heavy draft that is necessary to carry away the carbonic acid and products of combustion through a high column stack makes excessive quantities of dust if fines are fed. The sustained heat also causes the fines to burn or to fuse and glaze which destroys the commercial value of the resulting product. For these reasons high column shafts are limited to the calcination of 2½" or 3" stone. In a rotary kiln, for example, where the stone is constantly agitated, the use of fines likewise causes excessive quantities of dust and interferences with the proper working of the apparatus and the quality of the product so that this apparatus is limited commercially to the calcination of larger than three-quarter inch stone.

My invention then consists in the treatment of crushed limestone, or other material which is capable of similar treatment, of a size which will pass through a screen of approximately one-quarter inch mesh. For the handling of such fine particles I feed it in a continuous stream onto a moving grate which carries it into a furnace where heated gases passing thereover and reflected downward by reverberatory arch above it serve to heat it while coal intermixed therewith before it is fed to the grate aids in this heating whereby the carbon dioxide is driven off and a uniform grade of lime is produced.

In practicing my invention the small particles which may vary in size from dust particles up to particles which will pass through a one-quarter inch mesh screen are spread in a layer of uniform thickness and permeability upon a porous support. Preferably, a series of such supports are provided capable of continuous or intermittent movement. The individual particles comprising the layer of material being treated remain motionless, however, relative to each other and to the support. Preferably the particles are insulated from contact with the metal portions of the support by interposing a lining of heat insulating material, such as burnt lime, to avoid under burning of the particles adjacent to the metal. Each support with its layer of material is brought successively within a zone of combustion maintained at or above the dissociation temperature of the carbonate and below the temperature of incipient fusion of the particles and a forced draft is maintained to burn the fuel mixed with the carbonate rapidly but without drawing a great excess of oxygen through the bed and to draw the products of combustion through the layer at a rate sufficient to quickly bring the carbonate to a working temperature throughout and to remove the carbon dioxide or "carbonic oxide" as rapidly as dissociated from the material. This increases the speed of calcination and prevents reversal of the reaction which may occur in the presence of an excess of carbon dioxide.

In the accompanying drawing I have indicated diagrammatically one form of apparatus suitable for carrying out my invention but it will be understood that various other forms of apparatus may be employed.

Referring to the drawing:

Fig. 1 is a central, longitudinal section of so much of a sintering machine as is necessary to an understanding of the invention, and by means of which the invention may be practiced;

Fig. 2 is a section on the line 2—2 of Fig. 1; and

Fig. 3 is a central longitudinal section of a sintering machine showing the exhaust fan.

Referring to Fig. 1 there is shown an air or wind box 10 suitably supported in any well known manner. A track comprising a pair of spaced rails 11, 11 or flanges extends longitudinally along side the wind box, which as shown are affixed to the frame work of the machine, but which it is understood may be supported by the outer walls of the wind box or in any other manner desired. The track 11 constitutes a fixed support for movable carriers or pallets such as 12. The pallets are preferably alike in construction and each consists of a pervious support for material and having wheels 13 to support the same on the track 11. The pallets are capable of being moved continuously or intermittently.

For imparting motion to the support or carrier, there may be provided a pair of sprocket wheels, such as the sprocket 15 having peripheral teeth to engage the wheels of the cars or pallets 12. The sprockets 15 serve to push the cars in an end to end series or train along the track 11, and also to elevate them to the track. Fixed curved guides, such as guide 16, partially encircle the sprockets 15 and assist in holding the pallets in engagement therewith while being elevated.

For filling the pallets 12 after having been elevated to the track 11 there may be provided a hopper 20 having sections of any desired number, two being shown by way of example.

The lower end of the hopper 20 is in alinement with the sides of the pallets 12. The interior is divided vertically into compartments 23, and 24 by partitions such as the partition 25. The compartment 23 serves to hold and to feed the limestone or other alkaline earth carbonate or preferably the mixture of the carbonate and coal or other fuel. The fuel is present in amounts from 2 to 4%, the mixture of carbonate and fuel preferably being moistened. The compartment 24 may be provided to hold burnt lime for covering the grates prior to receiving the charge but it may be omitted if desired. Over the track 11 traversed by the pallets 12 after having been filled, there is positioned a reverberatory arch 30 having opposed side walls 31 and 32 in close proximity to the upper edges of the pallets, and having end walls 33, 34 in similar alinement. The reverberatory arch may be supported in any suitable manner, as by brackets such as 35, and is constructed of refractory material of conventional type. Toward the rear of the furnace there is provided a plurality of burners or grates such as 36, or other sources of heat for applying heat to the charge on the pallets.

The burning or dissociation of alkaline earth carbonates, of which limestone may be taken as a typical example, may be said to require two stages: (1) a preliminary heating to bring the bed of material up to the dissociation or burning temperature and (2) a maintenance of the limestone at this temperature until dissociation is completed. In the present invention the pallets continuously and slowly transport the limestone through the heated arch covered space or heating chamber. As soon as a given pallet has carried its load of limestone into position under the head end of the arch, the heated gases filling the space under the arch are drawn down into contact with and through the bed by the suction of the fan and ignite the solid fuel, which has been mixed with limestone, in that portion of the bed near the upper surface. The combustion of the fuel throughout the entire depth of the bed thereupon proceeds rapidly, thereby quickly raising the temperature of all the limestone on the given pallet approximately to the dissociation point or "working temperature". The amount of solid fuel mixed with the stone is sufficient for this preliminary heating although it is much less than the amount required to furnish sufficient heat to accomplish complete dissociation.

Without the preliminary heating throughout the entire depth of bed thus obtained by quickly burning the small amount of solid fuel mixed with the stone, an extended period of time is required to heat up the entire bed, especially the lower portions thereof, for in this case the preheating must be accomplished slowly by heat from the combustion gases which first contact with the upper portions of the bed and give up their heat there. Consequently, it is only some time after those upper portions have been sufficiently heated that the lower portions become heated to the dissociation temperature.

The bed of stone which is quickly heated throughout to the dissociation temperature by the combustion of the solid fuel is kept hot while being transported slowly toward the far end of the chamber by the heated combustion gases, which thus supply the heat required for the dissociation of the carbonate. From the burners a constant supply of these hot gases is delivered into the chamber to be drawn down through the bed of stone by the suction of the fan, giving up their heat to the stone as they pass through the bed. The burner may readily be adjusted to supply the gas as required, and may be of any of the usual forms, depending on the fuel available. Preferably, the temperature is kept as high as possible, but below fusion or over-burning temperature of the particular material being calcined.

For example, with a certain high calcium limestone 3" beds of ¼" size stone were calcined with and without the addition of 4% coal. When the coal was mixed with the stone, less than 5 minutes time was required to bring the entire layer up to active dissociation temperature (in this case about 850° C.) and complete decomposition was effected in another 25 minutes at approximately 1100° C. With no coal premixed with the stone, however, the other conditions remaining the same, the preheating by hot gases alone required 15 minutes.

The section of the burning chamber utilized for the preheating (approximately ⅕ of the entire chamber) is herein called the preheating zone, and the section utilized for dissociation is called the high temperature zone. It will of course be understood that there is no sharp line of distinction between these sections and that they may overlap to some degree.

The speed of the pallets is regulated by adjusting the speed of the driving mechanism so that the stone remains in the treatment chamber until dissociation is complete. After having burned, the material is passed out and discharged from the pallets in the conventional manner.

It will be seen that during the treatment the respective particles of material have not been mechanically disturbed, but have been maintained on the pallets without agitation or displacement, consequently very little if any dust is carried off by the stream of gases. This results in a product of extreme fineness which is exceptionally adapted for use in dehydrating moist gases and for similar purposes and the product is itself peculiarly adapted for the subsequent manufacture of hydrated lime.

The utilization of fines makes profitable the disposal of the smaller sizes of limestone, dolomite and magnesite, which are being produced in constantly increasing quantity due to modern method of blasting and the use of crushers in the quarries. With prior methods of treatment the amount of small stone which can be utilized is only a small fraction of the total output of small stone from the average quarry.

Although I have set forth and described one process for producing my improved production, it is obvious that various changes may be made in the process or in the separate steps thereof without modifying or changing the essential features and characteristics of the product produced and that such product remains substantially the same, although slight modifications may be made in its appearance, texture and in its physical and chemical characteristics. It is also obvious that the process may be carried out in connection with various types of apparatus other than a particular type of apparatus shown in the drawing merely for the purpose of illustration.

Having thus described my invention I claim:

1. The process of calcining alkaline earth carbonates, which consists in mixing small particles of the carbonate with a small proportion of solid fuel, spreading the mixture in a layer uniform as to thickness and permeability, exposing the entire surface of the layer to the action of the heated gases of combustion from a source of heat supported independently of said layer and causing said gases to pass through the entire layer at a relatively constant rate whereby said solid fuel is burned and said carbonate is rapidly heated to a temperature below the incipient fusion point and above the decomposition temperature of the carbonate and maintaining the layer within the said temperature range by continued passage of said gases until the carbonate is converted into oxide.

2. The process of burning earthy carbonate material which consists in arranging a mixture of the material and a small proportion of solid fuel in a relatively thin pervious layer, exposing the entire upper surface of the layer to gases heated to a temperature above the dissociation temperature of the carbonate and below the temperature of incipient fusion thereof from a source of heat supported independently of said layer, passing said gases through said layer to ignite the fuel thereby to bring the entire layer rapidly to a temperature above the dissociation temperature of the carbonate, and continuing the passing of said heated gases to maintain the temperature above the dissociation point of said carbonate until the material is converted into oxide.

3. The process of burning earthy carbonate material which consists in arranging a mixture of material and a small proportion of solid fuel in a relatively thin layer uniform as to thickness and permeability on a pervious support, insulating the material from said support by a pervious layer of heat insulating material, exposing the entire upper surface of the first mentioned layer to gases of combustion from a source of heat supported independently of said layer, said gases being heated to a temperature above the dissociation temperature of the carbonate and below the temperature of incipient fusion thereof, passing said gases of combustion through said layer to ignite the fuel thereby to bring the entire layer rapidly to a temperature above the dissociation temperature of the carbonate, continuing the passing of said heated gases to maintain the temperature of the material above the dissociation point of said carbonate until the material is converted into oxide.

4. The process of burning untreated limerock fines comprising particles one-fourth inch and less in diameter to produce caustic lime, which consists in arranging the limerock mixed with approximately four percent of solid fuel in a thin, pervious layer, causing heated gases of combustion from a source of heat independent of said layer to play upon the entire upper surface of the layer at a temperature above the dissociation temperature of the limerock and below the temperature of incipient fusion, causing said gases to pass through said layer at a relatively rapid rate to ignite the fuel thereby to bring the entire layer rapidly to the dissociation temperature of the limerock, continuing the passing of said gases to the temperature of the layer above the dissociation point and below the fusion point of the limerock until all the carbonic acid gas has been dissociated from the limerock.

5. The continuous process of calcining lime-rock in fine particles which consists in mixing with the limerock a small proportion of solid fuel, spreading the mixture in a continuous thin pervious layer, continuously causing currents of gases heated from a source of heat external to the layer to a temperature above the decomposition temperature of the limerock and below the temperature of incipient fusion to play upon the entire surface of that portion of the layer undergoing calcination and to be passed through said layer thereby first burning the solid fuel in said layer to rapidly heat the layer through its depth to approximately the dissociation temperature of the limerock and then maintaining the layer at a calcining temperature until the limerock is converted into oxide.

6. The continuous process of calcining limerock in fine particles which consists in mixing with the limerock a small proportion of solid fuel sufficient to heat the limerock to approximately the decomposition point without completely calcining said limerock, spreading the mixture in a continuous thin pervious layer, moving said layer while causing gases heated from a source of heat external to said layer to a temperature above the decomposition temperature of the limerock and below the temperature of incipient fusion, to play upon the entire surface of that portion of the layer undergoing calcination and to be passed through said layer thereby first burning the solid fuel in said layer to rapidly heat the layer through its depth and then maintaining the layer at a calcining temperature until the limerock is converted into oxide.

7. The process of calcining alkaline earth carbonate material which consists in exposing the entire surface of a layer of a mixture of finely divided carbonate material and approximately 4% of solid fuel to gases of combustion from a source of heat supported independently of said layer having a temperature above the dissociation temperature of the carbonate, whereby the solid fuel is ignited and the layer is heated quickly to a temperature above the dissociation temperature of the carbonate and below the fusion temperature thereof, maintaining a relatively constant flow of said gases of combustion through the entire layer until said carbonate is dissociated and removing the carbonic acid with the said gases.

8. The process of continuously calcining finely divided earthy carbonate material, which comprises forming a pervious layer of a mixture of said material and a small proportion of solid fuel, continuously feeding the layer through a zone heated by gases of combustion from a source of heat supported independently of said layer to a temperature below the point of incipient fusion of the material and above the dissociation temperature of the carbonate whereby said solid fuel is burned and said layer is rapidly heated throughout to a calcining temperature, passing said heated gases through said layer until the carbon dioxide is expelled from the carbonate, and then discharging the material from the heated zone.

In testimony whereof I have hereunto set my hand.

REED W. HYDE.